US006941436B2

(12) United States Patent
Lee et al.

(10) Patent No.: US 6,941,436 B2
(45) Date of Patent: Sep. 6, 2005

(54) METHOD AND APPARATUS FOR MANAGING MEMORY BLOCKS IN A LOGICAL PARTITIONED DATA PROCESSING SYSTEM

(75) Inventors: Van Hoa Lee, Cedar Park, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 10/142,574

(22) Filed: May 9, 2002

(65) Prior Publication Data

US 2003/0212873 A1 Nov. 13, 2003

(51) Int. Cl.[7] ................................................ G06F 12/00
(52) U.S. Cl. ....................... 711/173; 711/129; 711/170; 711/172; 707/1; 710/8
(58) Field of Search ................................ 711/129, 170, 711/172, 173; 707/1; 710/8

(56) References Cited

U.S. PATENT DOCUMENTS

| | | | | |
|---|---|---|---|---|
| 5,784,702 A | | 7/1998 | Greenstein et al. | 711/173 |
| 6,247,109 B1 | | 6/2001 | Kleinsorge et al. | 712/13 |
| 6,330,656 B1 | | 12/2001 | Bealkowski et al. | 712/13 |
| 6,363,468 B1 | * | 3/2002 | Allison | 711/173 |
| 2002/0016891 A1 | * | 2/2002 | Noel et al. | 711/153 |
| 2002/0108074 A1 | | 8/2002 | Shimooka et al. | 714/25 |
| 2002/0152344 A1 | | 10/2002 | Holm et al. | 710/260 |
| 2003/0028739 A1 | * | 2/2003 | Li et al. | 711/170 |
| 2003/0126396 A1 | | 7/2003 | Camble et al. | 711/173 |
| 2003/0131042 A1 | | 7/2003 | Awada et al. | 709/104 |
| 2003/0131214 A1 | * | 7/2003 | Downer et al. | 712/13 |

FOREIGN PATENT DOCUMENTS

| | | | |
|---|---|---|---|
| EP | 0 405 724 A2 | 1/1991 | G06F/9/46 |

OTHER PUBLICATIONS

Lee et al., Method and Apparatus for Dynamically Allocating and Deallocating Processors in a Logical Partitioned Data Processing System.
Lee et al., Method and Apparatus for Dynamically Managing Input/Output Slots in a Logical Partitioned Data Processing System.
Davidson et al., "Dynamic Addition/Deletion of a Parallel CPU", IBM Technical Disclosure Bulletin, vol. 20, No. 6, Nov., 1977, pp. 2191–2192.

* cited by examiner

*Primary Examiner*—Donald Sparks
*Assistant Examiner*—Ngoc V Dinh
(74) *Attorney, Agent, or Firm*—Duke W. Yee; Mark E. McBurney; Wayne P. Bailey

(57) ABSTRACT

A method, apparatus, and computer instructions for managing memory blocks. In response to a request to deallocate a memory block from a partition, all processes are prevented from using the memory block. The memory block is isolated from the partition in response to preventing use of the memory block. The memory block is deallocated to form a free memory block.

26 Claims, 7 Drawing Sheets

METHOD AND APPARATUS FOR MANAGING MEMORY BLOCKS IN A LOGICAL PARTITIONED DATA PROCESSING SYSTEM

CROSS REFERENCE TO RELATED APPLICATIONS

The present invention is related to the following applications entitled: "Method and Apparatus for Dynamically Allocating and Deallocating Processors in a Logical Partitioned Data Processing System", Ser. No. 10/142,545, and "Method and Apparatus for Dynamically Managing Input/Output Slots in a Logical Partitioned Data Processing System, Ser. No. 10/142,524, all filed even date hereof, assigned to the same assignee, and incorporated herein by reference.

BACKGROUND OF THE INVENTION

1. Technical Field

The present invention relates generally to an improved data processing system, and in particular, to a method and apparatus for managing components in a data processing system. Still more particularly, the present invention provides a method and apparatus for managing memory blocks in a logical partitioned data processing system.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

With respect to hardware resources in a LPAR system, these resources are disjointly shared among various partitions, themselves disjoint, each one seeming to be a stand-alone computer. These resources may include, for example, input/output (I/O) adapters, memory dimms, non-volatile random access memory (NVRAM), and hard disk drives. Each partition within the LPAR system may be booted and shutdown over and over without having to power-cycle the whole system.

In reality, some of the I/O devices that are disjointly shared among the partitions are themselves controlled by a common piece of hardware, such as a host Peripheral Component Interface (PCI) bridge, which may have many I/O adapters controlled or below the bridge. The host bridge and the I/O adapters connected to the bridge form a hierarchical hardware sub-system within the LPAR system. Further, this bridge may be thought of as being shared by all of the partitions that are assigned to its slots.

Currently, when a system administrator wants to change resources given to different partitions, the partitions affected by the change must be brought down or shut down before these resources can be deallocated from one partition and reallocated to another partition. This type of deallocation and allocation capability is called static logical partitioning. This type of capability causes a temporary disruption of normal operation of the affected partitions. This temporary disruption of normal operation may affect users or other clients of the LPAR system.

Therefore, it would be advantageous to have an improved method, apparatus, and computer instructions for managing partitions in a LPAR system without requiring a disruption in operations of the affected partitions.

SUMMARY OF THE INVENTION

The present invention provides a method, apparatus, and computer instructions for managing memory blocks. In response to a request to deallocate a memory block from a partition, all processes are prevented from using the memory block. The memory block is isolated from the partition in response to preventing use of the memory block. The memory block is deallocated to form a free memory block.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
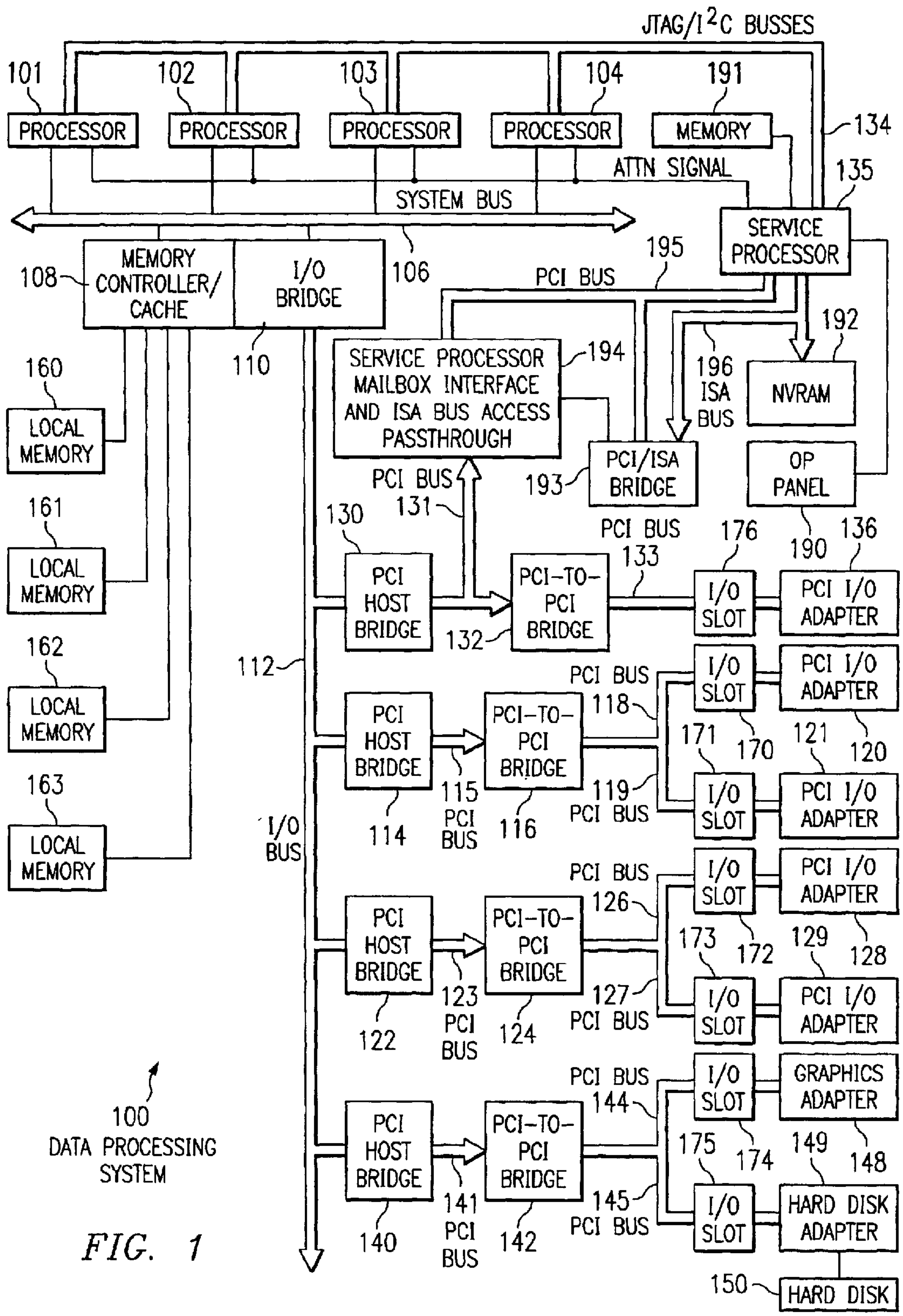
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and I/O adapters 120, 128, and 129 may be assigned to logical partition P1; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P1. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/$I^2C$ busses 134. JTAG/$I^2C$ busses 134 are a combination of JTAG/scan busses (see IEEE 1149.1) and Phillips $I^2C$ busses. However, alternatively, JTAG/$I^2C$ busses 134 may be replaced by only Phillips $I^2C$ busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/$I^2C$ busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 101–104 for execution of the code loaded into local memory 160–163. While the host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
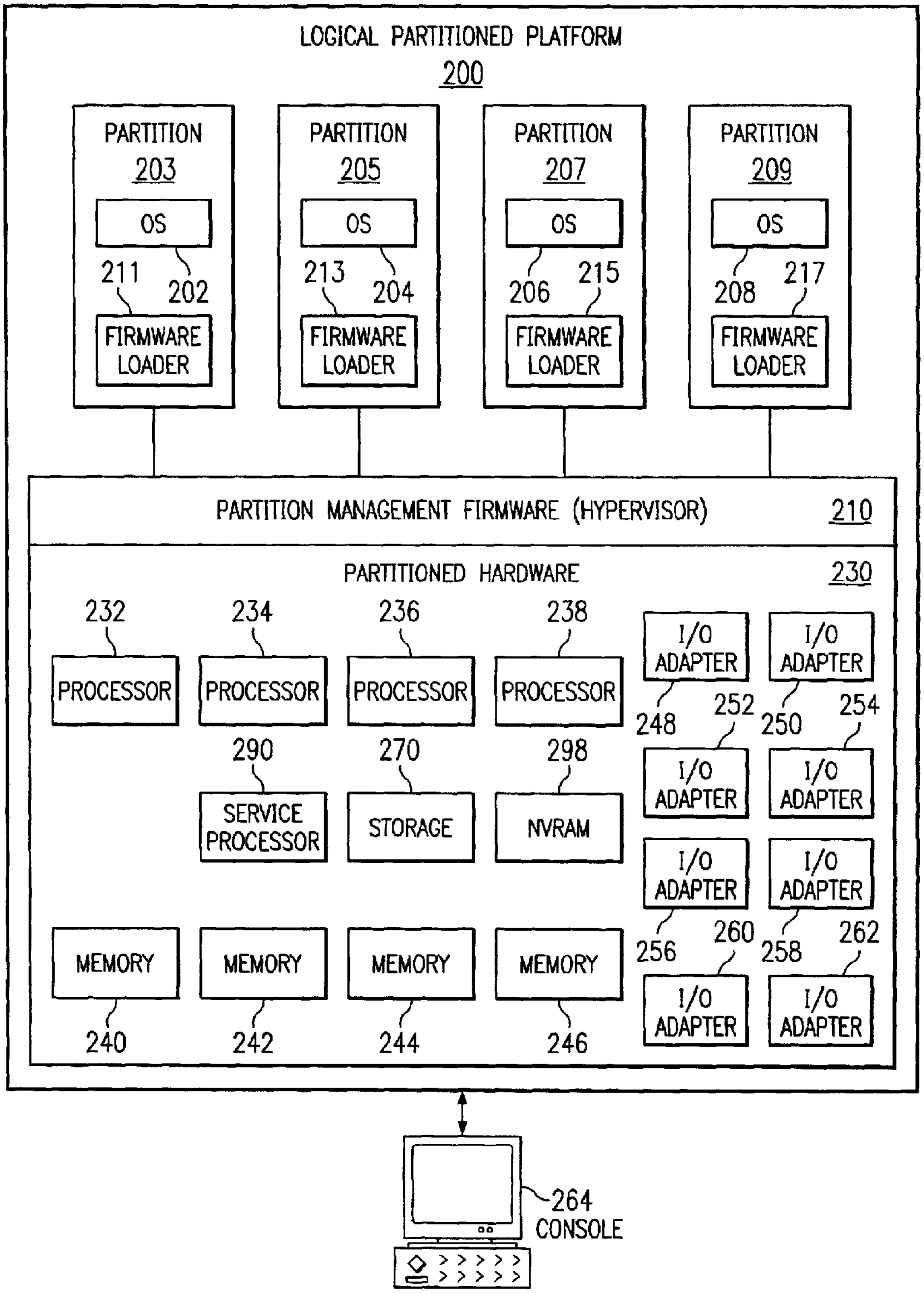
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partition's memory to execute the partition firmware.

Partitioned hardware 230 includes a plurality of processors 232–238, a plurality of system memory units 240–246, a plurality of input/output (I/O) adapters 248–262, and a storage unit 270. Partitioned hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logical partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as console 264. Console 264 is a separate data processing system from which a system administrator may perform various functions including reallocation of resources to different partitions.

Figure 3:
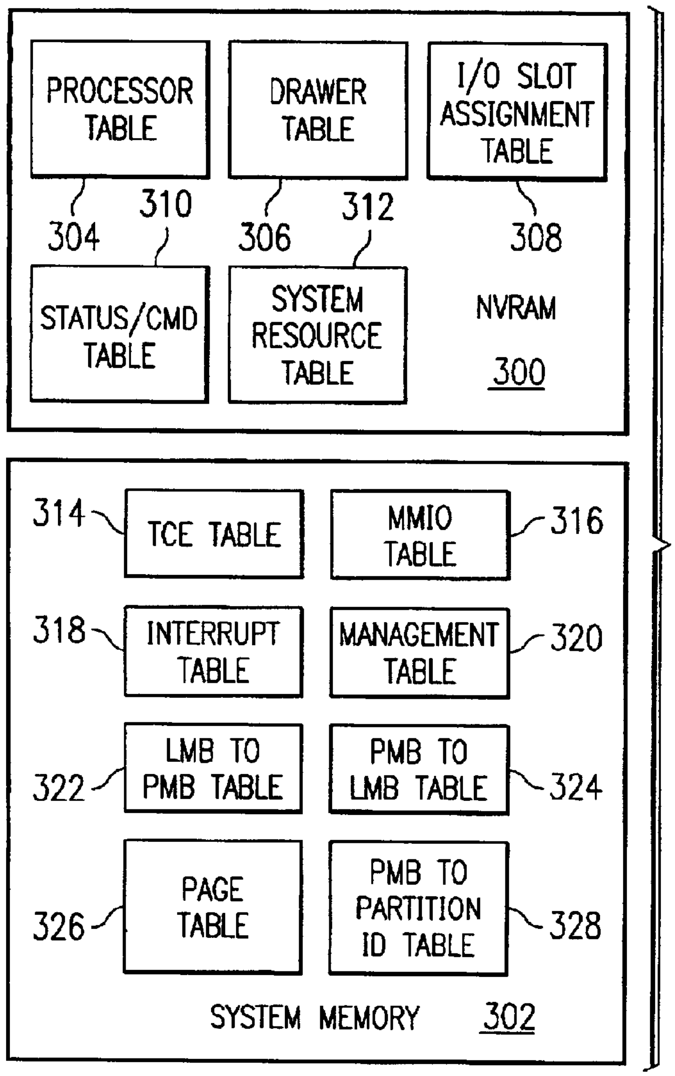
FIG. 3 is a diagram illustrating LPAR tables in accordance with a preferred embodiment of the present invention.

Turning next to FIG. 3, a diagram illustrating LPAR tables is depicted in accordance with a preferred embodiment of the present invention. In this example, LPAR tables are located in NVRAM 300 and system memory 302. NVRAM 300 may be implemented as NVRAM 298 in FIG. 2, and system memory 302 may be implemented as memory 244 in FIG. 2. The information in these tables is used for identifying what resources are assigned to particular partitions as well as status information.

In this example, in NVRAM 300, these tables include processor table 304, drawer table 306, input/output (I/O) slot assignment table 308, status/command table 310, and system resource table 312. Processor table 304 maintains a record for each of the processors located within the LPAR data processing system. Each record in this table may include, for example, an ID of the logical partition assigned to the processor, a physical location ID, a processor status, and a processor state.

Drawer table 306 includes a record for each drawer within the LPAR system in which each record may contain drawer status and the number of slots. A drawer is a location within a frame. Each drawer has some maximum number of slots into which processor nodes, I/O devices, and memory boards are mounted. Frames provide a mounting as well as power for various components.

I/O slot assignment table 308 includes a record for each slot in the LPAR system and may, for example, include a location code, an I/O device ID, and an ID of the partition assigned to the slot.

System memory 302 includes translation control entry (TCE) table 314, memory mapped input/output (MMIO) table 316, interrupt table 318, management table 320, logical memory block (LMB) to physical memory block (PMB) table 322, physical memory block to logical memory block (LMB) table 324, and physical memory block to partition ID table 328. These tables contain information used to identify resources used to access I/O slots. For example, TCE table 314 may include translation control entries (TCEs) for direct memory access (DMA) addresses for each slot. Additionally, memory mapped input/output (MMIO) addresses for slots are located in MMIO table 316. Further, interrupts assigned to the different slots also may be identified in interrupt table 318. This information is controlled and accessible by a hypervisor, such as hypervisor 210 in FIG. 2.

System memory 302 also includes page table 326, which is used by the operating system to implement virtual memory. The entries in page table 326 are used to translate 4K-page processor virtual addresses into 4K-page physical addresses.

Status/command table 310 includes a record for each partition. This table may include a command state of the partition, a current command for the partition, and a last command for the partition.

System resource table 312 maintains information regarding resources available for the system. This table may include, for example, a maximum number of slots, a maximum number of processors, a maximum number of drawers, total memory installed, total memory allocated for the partitions, and time information.

Management table 320 is used for obtaining exclusive access to a memory block. Specifically, this table is used to lock a memory block for use by a process to the exclusion of any other process. Logical memory block to physical memory block table 322 is used to obtain the identification of a physical memory block from a logical memory block identifier. One logical memory block to physical memory block table, such as logical memory block to physical memory block table 322, is present for each partition. Physical memory block to logical memory block table 324 is used for a reverse function to obtain an identification of a logical memory block from a physical memory block address. In a preferred embodiment of the present invention, only one physical memory block to logical memory block (PMB-to-LMB) table is present for the entire data processing system. Physical memory block to partition ID table 328 is used to obtain the partition ID of the owner of a physical memory block. This table also contains the status and the state of a physical memory block. These tables are managed by a hypervisor, such as hypervisor 210 in FIG. 2.

Figure 4:
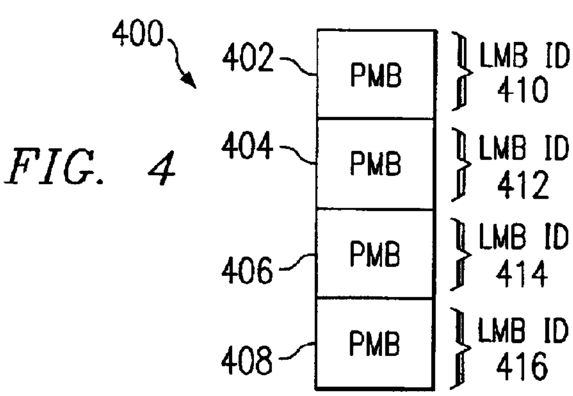
FIG. 4 is a diagram illustrating memory blocks in accordance with a preferred embodiment of the present invention.

With reference now to FIG. 4, a diagram illustrating memory blocks is depicted in accordance with a preferred embodiment of the present invention. In this example, memory 400 includes physical memory blocks (PMBs) 402, 404, 406, and 408. Memory 400 may be implemented as system memory in a logical partitioned data processing system, such as logical partitioned platform 200 in FIG. 2. This partitioning of memory 400 takes the form of a logical partition of 256 MB blocks of memory in this example. Of course, other types of partitions of memory 400 may be made. Further, although this example illustrates four 256 MB memory blocks, other numbers of memory blocks may be used depending on the particular implementation. The numbers and sizes of the memory blocks are merely for purposes of illustration and are not intended as limitations to the present invention.

Each of these memory blocks is associated with a memory block ID. In this example, physical memory block 402 is associated with logical memory block ID 410; physical memory block 404 is associated with logical memory block ID 412; physical memory block 406 is associated with logical memory block ID 414; and physical memory block 408 is associated with logical memory block ID 416. The identifications of these physical and logical memory blocks are maintained in tables, such as logical memory block to physical memory block table 322 and physical memory block to logical memory block table 324 in FIG. 3.

A hypervisor, such as hypervisor 210 in FIG. 2, may receive a call to allocate physical memory blocks, such as those in memory 400, for a partition's logical memory during instantiation of the partition. As a result of the allocation of memory, the partition will start with the requested number of logical memory blocks being equal to the logical memory size of the partition. The allocated physical memory blocks are marked as being in a running state and owned by the partition. This marking is performed in a physical memory block to partition ID table, such as physical memory block to partition ID table 328 in FIG. 3. At the same time, the mapping of the logical memory block to physical memory block, and vice versa, are updated in the corresponding tables.

A partition is typically configured with a range of logical memory block IDs based on the potential maximum memory size established for the partition. For example, a partition may include the following logical memory block IDs: LMB-ID0, LMB-ID1, . . . , and LMB-IDX, in which this last block ID (LMB-IDX) is the maximum partition size divided by the size of the block of memory minus one. Initially, however, only LMB-ID0, LMB-ID1, . . . , and LBM-IDN are initially allocated and mapped. In this example, N is equal to the partition size divided by the memory block size minus one.

Within a partition, some logical memory blocks are always needed for normal operation of the partition. These types of logical memory blocks are referred to as static memory blocks and cannot be deallocated. Further, the partition also includes dynamic logical memory blocks, which may be deallocated from the partition. This process is applied only to dynamic memory blocks in these examples. If an attempt is made to deallocate a static memory block, the attempt will fail since the hypervisor will not allow the process to start, which could crash the system.

The present invention provides a method, apparatus, and computer implemented instructions for deallocating and allocating memory blocks among different partitions. The mechanism of the present invention allows for the reallocation of memory blocks without requiring partitions to be brought down or terminated.

Figure 5:
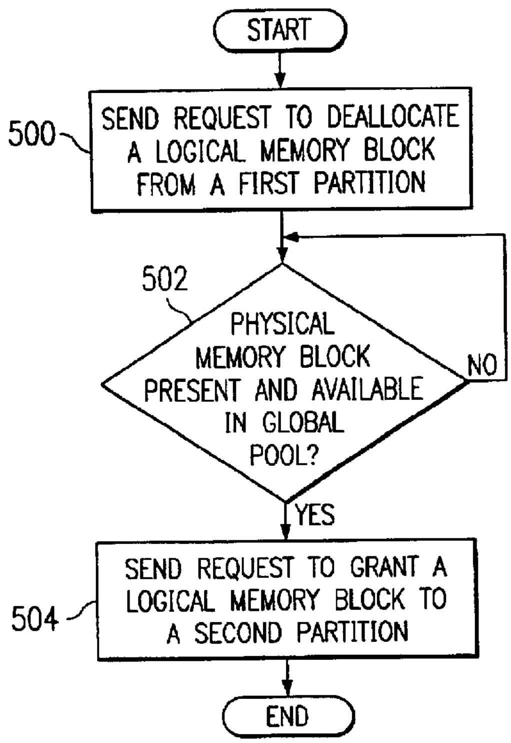
FIG. 5 is a flowchart of a process used for moving a physical memory block from one partition to another partition in accordance with a preferred embodiment of the present invention.

Turning now to FIG. 5, a flowchart of a process used for moving a physical memory block from one partition to another partition is depicted in accordance with a preferred embodiment of the present invention. The process illustrated in FIG. 5 may be implemented in a hardware management console, such as console 264 in FIG. 2.

The process begins by sending a request to deallocate a logical memory block from a first partition (step 500). This request is sent in the form of a call to the operating system of a partition. This call results in the operating system initiating steps needed to deallocate the logical memory block from the first partition to free the physical memory block mapped to this logical memory block for placement into the system memory pool for reallocation.

Next, a determination is made as to whether the physical memory block is present and becomes available in the global pool (step 502). If the physical memory block is present and available in the global pool, a request is sent to grant a logical memory block to a second partition (step 504) and the process terminates thereafter. This request is sent as a request to the operating system in the second partition to grant the logical memory block to the second partition.

Returning again to step 502, if a physical memory block is not present and available in the global pool, the process returns to step 502. The process continues to return to step 502 until a physical memory block becomes present and is available.

Figure 6:
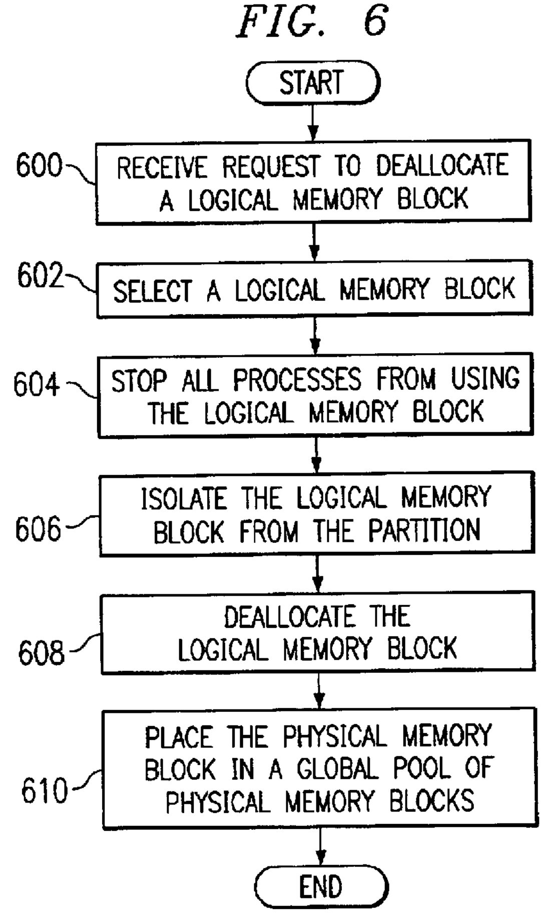
FIG. 6 is a flowchart of a process used for deallocating a memory block in accordance with a preferred embodiment of the present invention.

With reference now to FIG. 6, a flowchart of a process used for deallocating a memory block is depicted in accordance with a preferred embodiment of the present invention. The process illustrated in FIG. 6 may be implemented in a logical partitioned data processing system, such as logical partitioned platform 200 in FIG. 2. In particular, the steps in FIG. 6 are implemented in an operating system such as operating system 202 in FIG. 2.

The process begins by receiving a request to deallocate a logical memory block (step 600). The request is received by the operating system for a partition in which a logical memory block is to be deallocated. A logical memory block is selected for deallocation (step 602). In these examples, selection of a logical memory block is performed by an operating system memory management process. The operating system's memory management process will decide which logical memory block is currently unused by any processes. If one unused logical memory block is found, this logical memory block must not be a static memory block. Othwewise, the search is repeated until one unused dynamic logical memory block is found.

All processes are stopped from using the logical memory block (step 604). The logical memory block is isolated from the partition (step 606) and the logical memory block is deallocated (step 608). Step 606 is accomplished by the operating system sending a call to the RTAS to isolate the logical memory block from the partition. In turn, the RTAS will call the hypervisor to achieve the isolation. In this example, the call made by the operating system is rtas_set_indicator( ). Parameters are included to identify the request as one to isolate the logical memory block from the partition.

The physical memory block is then placed in a global pool of physical memory blocks (step 610) and the process terminates thereafter. This step is performed by the hypervisor immediately when the partition operating system initiates step 608 successfully. Step 608 occurs when the logical memory block is isolated from the partition. This step is initiated by the operating system making a call to the RTAS to deallocate the logical memory block. The RTAS performs this deallocation by making various calls to the hypervisor as described in more detail below.

Figure 7:
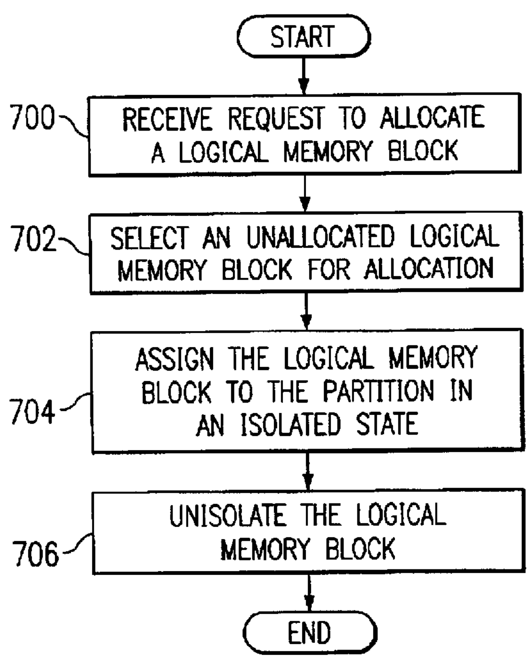
FIG. 7 is a flowchart of a process used for allocating a memory block to a partition in accordance with a preferred embodiment of the present invention.

With reference next to FIG. 7, a flowchart of a process used for allocating a memory block to a partition is depicted in accordance with a preferred embodiment of the present invention. The process illustrated in FIG. 7 may be implemented in a logical partitioned data processing system, such as logical partitioned platform 200 in FIG. 2. In particular, FIG. 7 illustrates steps taken by an operating system receiving a request to allocate a logical memory block.

The process begins by receiving a request to allocate a logical memory block (step 700). This request is received by the operating system in the partition that is to receive the allocation of the logical memory block. An unallocated logical memory block is selected for allocation (step 702). This logical memory block may be selected from a list of logical memory block identifiers that were configured for the partition. The logical memory block is assigned to the partition in an isolated state (step 704). The logical memory block is assigned to the partition in an isolated state through a call made by the operating system to the RTAS, which in turn, makes calls to the hypervisor to accomplish the assignment. This call is, for example, a rtas_set_indicator( ) call made to the RTAS with parameters to indicate that the allocation is to occur.

The logical memory block is then unisolated (step 706), with the process terminating thereafter. The unisolation is performed by a call made by the operating system to the RTAS when the operating system is ready to integrate the logical memory block into its memory pool. This call is, for example, rtas_set_indicator( ) call with the appropriate parameters to indicate an unisolation is to occur.

Figure 8:
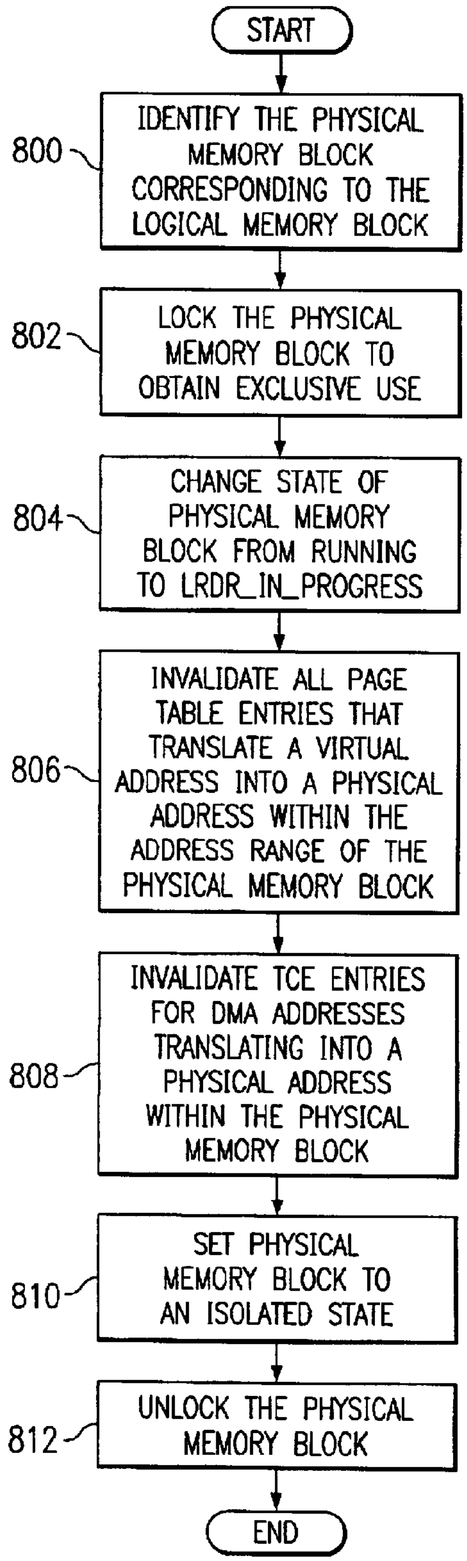
FIG. 8 is a flowchart of a process used for isolating a logical memory block from a partition in accordance with a preferred embodiment of the present invention.

With reference now to FIG. 8, a flowchart of a process used for isolating a logical memory block from a partition is depicted in accordance with a preferred embodiment of the present invention. The process illustrated in FIG. 8 may be implemented in a logical partitioned data processing system, such as logical partitioned platform 200 in FIG. 2. In particular, the steps illustrated in this figure may be implemented by RTAS in a firmware loader, such as firmware loader 211, in FIG. 2. The steps described involve calls made by the RTAS to a hypervisor, such as hypervisor 210 in FIG. 2.

The process begins by identifying the physical memory block corresponding to the logical memory block (step 800). The physical memory block may be identified by using logical memory block to physical memory block table 322, in FIG. 3, with the logical memory block identifier being the index into this table. The physical memory block is locked to obtain exclusive use (step 802). The physical memory block may be locked using management table 320 in FIG. 3. The state of the physical memory block is changed from running to logical resource dynamic reconfiguration in progress (LRDR_IN_PROGRESS) (step 804). The status and the state of a physical memory block is maintained in a physical memory block to partition ID table, such as physical memory block to partition ID table 328 in FIG. 3. LRDR_IN_PROGRESS is a defined state to indicate that a memory block is in the process of reconfiguration. Since there is generally no physical hardware to make the memory block unavailable to the partition while it is in the process of giving up the memory block, the LRDR_IN_PROGRESS state is assigned to the memory block so that the hypervisor can block further attempts to map the address of this memory block in the page table entries and the TCE table entries owned by the partition.

All page table entries that translate a virtual address into a physical address within the address range of the physical memory block are invalidated (step 806). These entries are invalidated in a page table, such as page table 326 in FIG. 3. All entries in TCE tables for all host PCI bridges, which translate a direct memory address (DMA) into a physical address in the address range of the physical memory block, are invalidated (step 808).

The physical memory block is set to an isolated state (step 810). When the physical memory block is in an isolated state, the memory block can no longer be used by the partition even though the partition is still the owner of the memory block. The physical memory block is unlocked (step 812) and the process terminates thereafter.

Figure 9:
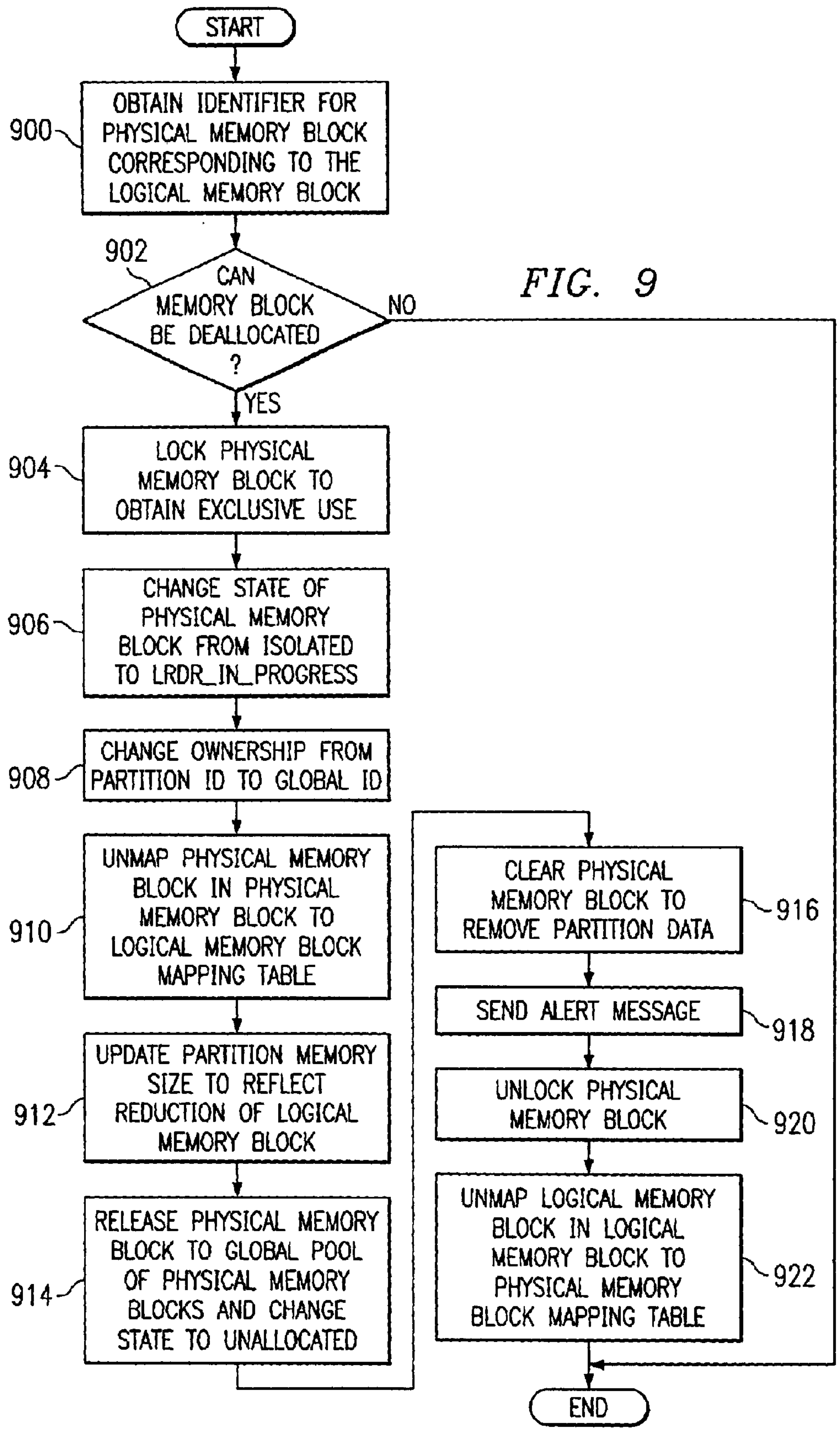
FIG. 9 is a flowchart of a process used for deallocating a memory block in accordance with a preferred embodiment of the present invention.

Turning now to FIG. 9, a flowchart of a process used for deallocating a memory block is depicted in accordance with a preferred embodiment of the present invention. The process illustrated in FIG. 9 may be implemented in a logical partitioned data processing system, such as logical partitioned platform 200 in FIG. 2. In particular, the steps illustrated in this figure may be implemented by RTAS in a firmware loader, such as firmware loader 211, in FIG. 2. The steps described involve calls made by the RTAS to a hypervisor, such as hypervisor 210 in FIG. 2.

The process begins by obtaining an identifier for the physical memory block corresponding to the logical memory block (step 900). This identifier may be obtained by using logical memory block to physical memory block table 322 in FIG. 3. The physical memory block identifier may be used to obtain status, state, and ownership information for the physical memory block. This information is stored in a physical memory block to partition ID table. Next, a determination is made as to whether the physical memory block can be deallocated (step 902). The memory block can be deallocated when the memory block is owned by the partition and in the isolated state. If the memory block can be deallocated, this information is used to lock the physical memory block to obtain exclusive use of the physical memory block (step 904).

Thereafter, the state of the physical memory block is changed from isolated to LRDR_IN_PROGRESS (step 906). Ownership is changed from the partition ID to the global ID 0 (step 908). The physical memory block in the physical memory block to the logical memory block mapping table is unmapped (step 910). The partition memory size is updated to reflect the reduction of the logical memory block (step 912). This update is made in the NVRAM. With respect to the update made in step 912, the hypervisor keeps the physical memory block to logical memory block table and other partition related information in a partition_info structure for each partition in system memory. The partition memory size is a field of this partition_info structure.

The physical memory block is released to the global pool of physical memory blocks and the state is changed to unallocated (step 914). The physical memory block is cleared to remove the partition data (step 916). An alert message is sent to the console (step 918). The physical memory block is unlocked (step 920). The logical memory block in the logical memory block to physical memory block mapping table is unmapped (step 922) and the process terminates thereafter. Step 922 makes the logical addresses corresponding to the logical memory block unusable to the partition.

With reference again to step 902, if the memory block cannot be deallocated, the process terminates.

Figure 10:
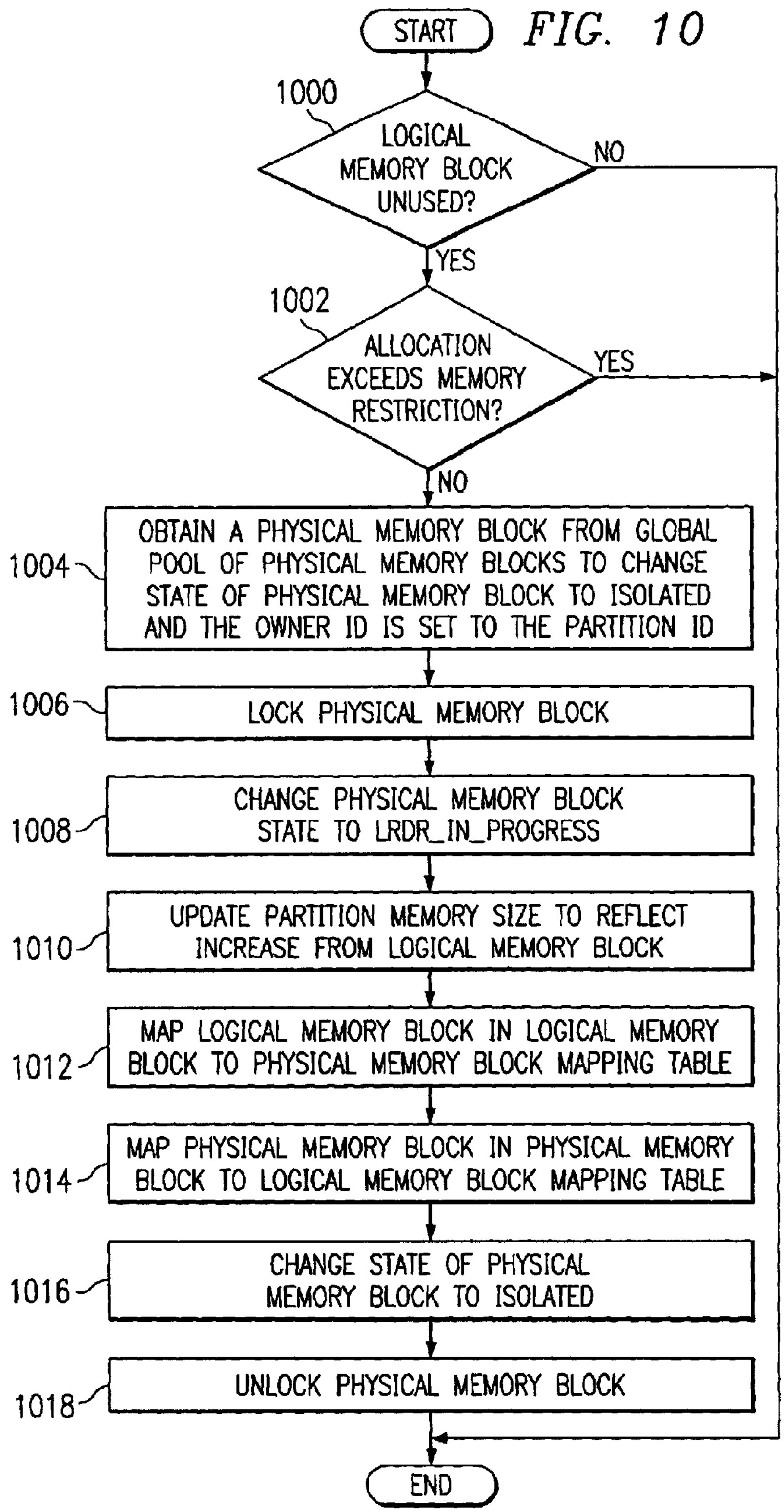
FIG. 10 is a flowchart of a process used for allocating a logical memory block to a partition in accordance with a preferred embodiment of the present invention.

With reference now to FIG. 10, a flowchart of a process used for allocating a logical memory block to a partition is depicted in accordance with a preferred embodiment of the present invention. The process illustrated in FIG. 10 may be implemented in a logical partitioned data processing system, such as logical partitioned platform 200 in FIG. 2. In particular, the steps illustrated in this figure may be implemented by RTAS in a firmware loader, such as firmware loader 211, in FIG. 2. The steps described involve calls made by the RTAS to a hypervisor, such as hypervisor 210 in FIG. 2.

The process begins by determining whether a logical memory block is unused (step 1000). This step is used to ensure that the requested logical memory block is not already in use or associated with a physical memory block. If the logical memory block is unused, a determination is made as to whether the allocation exceeds the memory restriction (step 1002). In some cases, allocating another logical memory block may exceed the maximum memory size for the partition. Step 1002 is employed to avoid exceeding the maximum memory size. If the allocation does not exceed the memory restriction, a physical memory block is obtained from the global pool of physical memory blocks to change the state of the physical memory block to isolated and the owner ID is set to the partition's ID (step 1004). The global memory pool manager uses the state to manage the memory blocks from concurrent requests. When a free memory block is given to a partition during dynamic memory allocation, the state is set to isolated to make that memory block no longer available from the pool.

The physical memory block is locked (step 1006). The physical memory block state is changed to LRDR_IN_PROGRESS (step 1008). LRDR_IN_PROGRESS is the transient state of a memory block when the memory block goes through the process of dynamic allocation/deallocation to a partition. The partition memory size is updated to reflect the increase from the logical memory block (step 1010). A logical memory block is mapped to the logical memory block to physical memory block mapping table (step 1012). In this example, the information may be entered in logical memory block to physical memory block table 322 in FIG. 3. A physical memory block is mapped in the physical memory block to logical memory block mapping table (step 1014). This mapping may be made in physical memory block to logical memory block table 324 in FIG. 3. The state of the physical memory block is changed back to isolated (step 1016). The physical memory block is unlocked (step 1018) and the process terminates thereafter.

With reference again to step 1002, if the allocation does exceed memory restrictions, the process terminates. Returning to step 1000, if the logical memory block is not unused, the process terminates.

Figure 11:
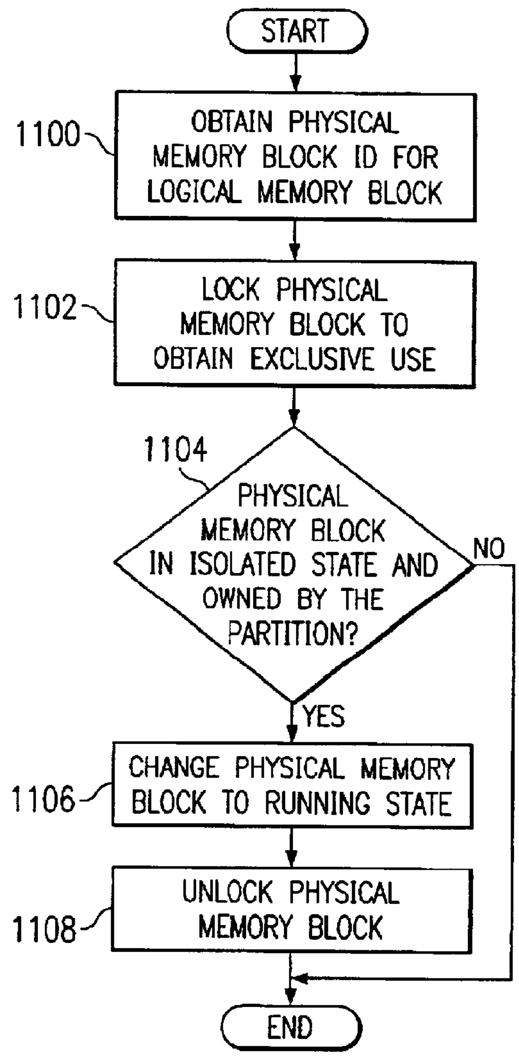
FIG. 11 is a flowchart of a process used for integrating a logical memory block into a memory pool of an operating system in accordance with a preferred embodiment of the present invention.

With reference now to FIG. 11, a flowchart of a process used for integrating a logical memory block into a memory pool of an operating system is depicted in accordance with a preferred embodiment of the present invention. The process illustrated in FIG. 11 may be implemented in a logical partitioned data processing system, such as logical partitioned platform 200 in FIG. 2. In particular, the steps illustrated in this figure may be implemented by RTAS in a firmware loader, such as firmware loader 211, in FIG. 2. The steps described involve calls made by the RTAS to a hypervisor, such as hypervisor 210 in FIG. 2.

The process begins by obtaining the physical memory block ID for the logical memory block (step 1100). This information is used to lock the physical memory block to obtain exclusive use (step 1102). A determination is then made as to whether the memory block is in an isolated state and is owned by the partition (step 1104). If the answer to this determination is yes, the state of the physical memory block is changed to running (step 1106).

With respect to the indication of the change in state as a signal to trigger a process or use of the memory, the hypervisor will use the state and ownership ID to handle page table entries and TCE table entries updates for the partition operating system. The partition operating system will know that the memory becomes available when entire dynamic memory allocation process returns a successful status. The physical memory block is unlocked (step 1108) and the process terminates thereafter. With reference again to step 1104, if the physical memory block is not in an isolated state and is not owned by the partition, the process also terminates.

Thus, the present invention provides an improved method, apparatus, and computer instructions for managing the deallocation and allocation of memory blocks on a dynamic basis. The mechanism of the present invention allows a memory block to be deallocated or allocated without having to terminate the operation of a partition. In this manner, disruptions in the normal operations of partitions in a logical partitioned data processing system are avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the particular components illustrated as participating in the dynamic deallocation and allocation of memory blocks are an operating system, a RTAS, and a hypervisor. These particular components are described for purposes of illustration and are not intended to limit the manner in which the processes for the dynamic allocation may be implemented. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logical partitioned data processing system for managing memory blocks, the method comprising:

responsive to a request to deallocate a memory block from a partition, preventing all processes from using the memory block;

responsive to preventing use of the memory block, isolating the memory block from the partition; and deallocating the memory block to form a free memory block.

2. The method of claim 1, wherein the memory block, prior to being deallocated, is exclusively accessed by the partition and not shared with other partitions.

3. The method of claim 1, wherein the isolating step comprises:

invalidating all pointers to the address range of the memory block.

4. The method of claim 3, wherein the pointers are a set of entries used to translate a virtual address into a physical address.

5. The method of claim 4, wherein the entries includes entries for at least one of a page table and a translation control entry table.

6. The method of claim 1, wherein an operating system instance running in the partition calls a management routine, the management routine being external to the partition, to perform the memory block isolation.

7. The method of claim 2, wherein the placing step comprises:

changing an identifier associated with the memory block from that of the partition to one for a pool of resources.

8. The method of claim 7, wherein the placing step further comprises:

clearing the memory block to remove all data for the partition.

9. The method of claim 7, wherein the placing step further comprises:

removing any mapping of the memory block for the partition.

10. The method of claim 1, wherein the partition is a first partition and further comprising:

responsive to a request to allocate the free memory block to a second partition, allocating the free memory block to the second partition to from an allocated memory block; and integrating the allocated memory block with other memory blocks allocated to the second partition.

11. The method of claim 10, wherein the allocating step comprises assigning the free memory block to the second partition in an isolated state, and the integrating step comprises unisolating the allocated memory block in the second partition.

12. The method of claim 10, wherein the allocating step includes:

locking the memory block;

after the locking of the memory block, mapping the memory block in a memory mapping table for the partition; and then unlocking the memory block.

13. A logical partitioned data processing system for managing memory blocks, the logical partitioned data processing system comprising:

a bus system;

a communications unit connected to the bus system;

a memory connected to the bus system, wherein the memory includes a set of instructions; and a processing unit connected to the bus system, wherein the processing unit executes the set of instructions to prevent all processes from using the memory block in response to a request to deallocate a memory block from a partition; isolate the memory block from the partition in response to preventing use of the memory block; and deallocate the memory block to from a free memory block.

14. A logical partitioned data processing system for managing memory blocks, the logical partitioned data processing system comprising:

preventing means, responsive to a request to deallocate a memory block from a partition, for preventing all processes from using the memory block;

isolating means, responsive to preventing use of the memory block, for isolating the memory block from the partition; and deallocating means for deallocating the memory block to form a free memory block.

15. The logical partitioned data processing system of claim 14, wherein the memory block, prior to being deallocated, is exclusively accessed by the partition and not shared with other partitions.

16. The logical partitioned data processing system of claim 14, wherein the isolating means comprises:

invalidating means for invalidating all pointers to the address range of the memory block.

17. The logical partitioned data processing system of claim 16, wherein the pointers are a set of entries used to translate a virtual address into a physical address.

18. The logical partitioned data processing system of claim 17, wherein the entries includes entries for at least one of a page table and a translation control entry table.

19. The logical partitioned data processing system of claim 14, wherein an operating system instance running in the partition calls a management routine, the management routine being external to the partition, to perform the memory block isolation.

20. The logical partitioned data processing system of claim 15, wherein a placing means comprises:

changing means for changing an identifier associated with the memory block from that of the partition to one for a pool of resources.

21. The logical partitioned data processing system of claim 20, wherein the placing means further comprises:

clearing means for clearing the memory block to remove all data for the partition.

22. The logical partitioned data processing system of claim 20, wherein the placing means further comprises:

removing means for removing any mapping of the memory block for the partition.

23. The logical partitioned data processing system of claim 14, wherein the partition is a first partition and further comprising:

allocating means, responsive to a request to allocate the free memory block to a second partition, for allocating the free memory block to the second partition to form an allocated memory block; and integrating means for integrating the allocated memory block with other memory blocks allocated to the second partition.

24. The logical partitioned data processing system of claim 23, wherein the allocating means comprises assigning means for assigning the free memory block to the second partition in an isolated state, and the integrating means comprises unisolating means for unisolating the allocated memory block in the second partition.

25. The logical partitioned data processing system of claim 23, wherein the allocating means includes:

locking means for locking the memory block;

mapping means for mapping the locked memory block in a memory mapping table for the partition; and unlocking means for unlocking the mapped memory block.

26. A computer program product in a computer readable medium for managing memory blocks, the computer program product comprising:

first instructions, responsive to a request to deallocate a memory block from a partition, for preventing all processes from using the memory block;

second instructions, responsive to preventing use of the memory block, for isolating the memory block from the partition; and third instructions for deallocating the memory block to form a free memory block, wherein the partition remains active and operational during the memory block deallocation from the partition.

* * * * *